Aug. 29, 1961 P. J. SNYDER 2,997,848
ROTARY ENGINE
Filed Dec. 4, 1958

INVENTOR
Peter J. Snyder
BY
ATTORNEYS ated Aug. 29, 1961

2,997,848
ROTARY ENGINE
Peter J. Snyder, 6723 Smithfield St., Elizabeth Township, Allegheny County, Pa.
Filed Dec. 4, 1958, Ser. No. 778,152
5 Claims. (Cl. 60—39.61)

My invention relates to a rotary engine utilizing a straight shaft and an eccentric piston affixed thereto to be driven in a predetermined angular direction. More particularly, my invention pertains to such an engine which is an effective, self-sustaining power producer having unique combustion and air compression elements.

My new construction provides a power producer of a rotary nature utilizing a straight in-line shaft for one or more cylinders as desired and a cylindrical chamber in each cylinder radially subdivided for effective accomplishment in each cylinder of successive exhaust, air intake, air compression and firing steps in a single revolution of an eccentric piston affixed to such shaft and sweeping the circular wall of the cylinder. Such cylinders may be placed in side-by-side arrangement and the respective pistons angularly displaced one from another for effective, relatively vibrationless and unidirectional power production. Further, combustion air is drawn in compressed and fed to a combustion chamber periodically openable to a portion of the cylinder to effect a firing step to drive the piston through its revolution to the next such firing. Particular valve means which are self-actionable are provided in conjunction with the combustion chamber to move during the firing step and direct the thrust of combusting gases in a piston driving direction.

Figure 1:
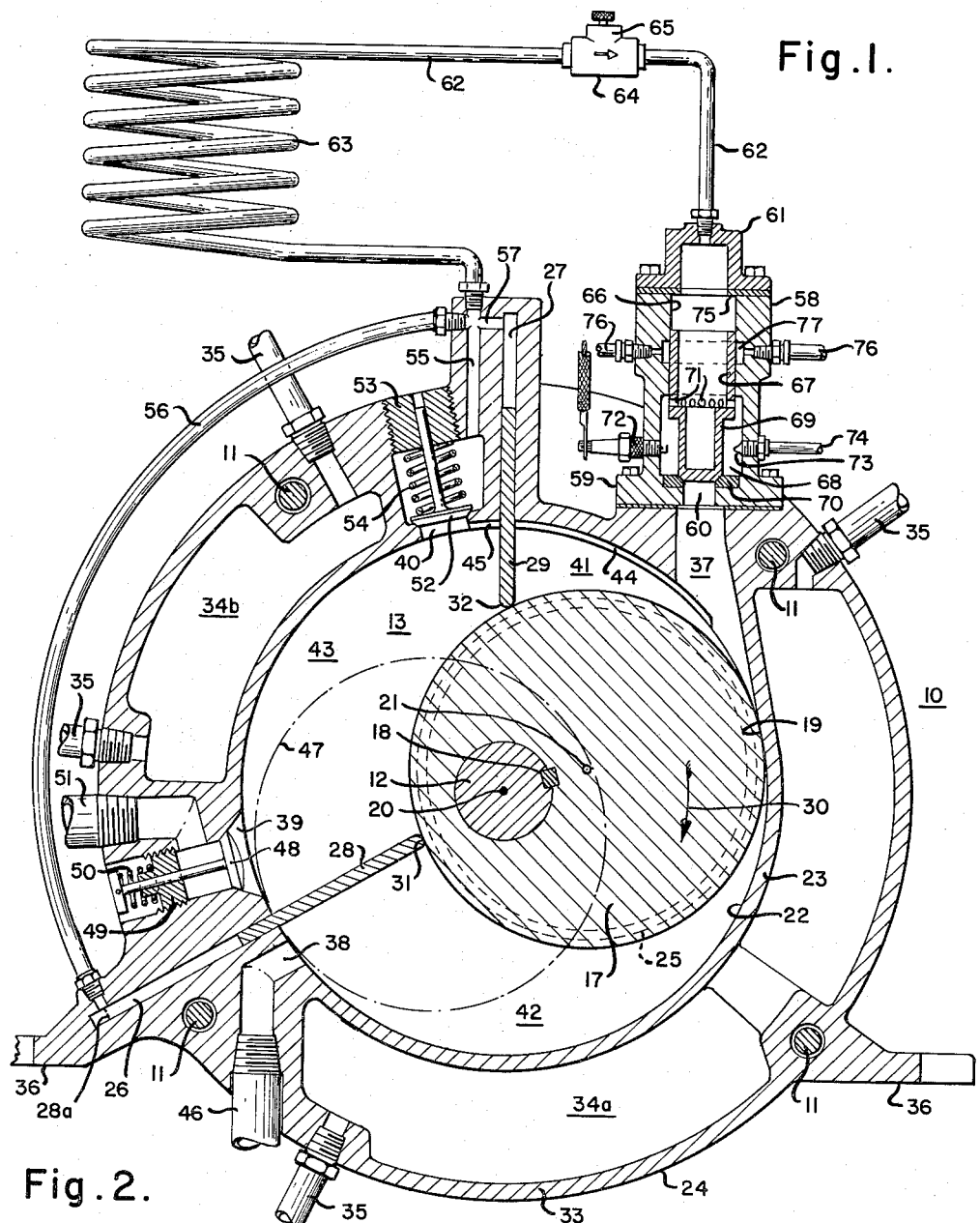
Figure 2:
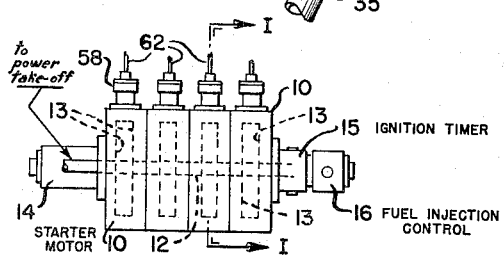

Other objects, features and advantages of my invention will be apparent from the following description and the accompanying drawings, which are illustrative of one embodiment only, in which FIGURE 1 is a view on cross section, taken along line I—I of FIGURE 2, looking endwise at a cylinder in the illustrated embodiment of my invention; and FIGURE 2 is a schematic view in side elevation of four cylinders rigidly connected in side-by-side arrangement to provide a four-cylinder rotary engine in accordance with this invention.

Referring to the drawings each cylinder 10 is joined to the adjoining cylinders by bolting rods 11 to make a rigid assembly capable of utilizing a common straight rotatable shaft 12 which passes through the respective end walls 13 of each cylinder. One end of the common shaft 12 is suitably connected to an electric starter motor 14 of a conventional nature and the other end of shaft 12 operates an ignition timer 15 and a fuel injection control 16 which may be mechanical or electrical, as desired. Although the embodiment in FIGURE 2 utilizes four cylinders, a rotary engine of this invention may comprise a single such cylinder and a single revolution of an eccentric piston 17 therein will accomplish steps that would take four strokes of a reciprocating piston in a conventional four-cycle internal combustion engine. Preferably, when more than one cylinder 10 is utilized in a single engine, the respective pistons are angularly displaced on a uniform basis. Thus, in such an engine with two cylinders, the respective eccentric pistons would preferably be one hundred eighty degrees apart; with three pistons, one hundred twenty degrees apart; and with four pistons ninety degrees apart. My new construction is relatively easy to fabricate and to assemble and is relatively long-lived in the course of effectively producing power.

In the illustrative cylinder 10 shown in FIGURE 1, piston 17 is circular, although it may have other smooth periphery shapes, and is fixed to shaft 12 by a key 18. The most distant point on the periphery of piston 17 is its longitudinally extending crest 19 on the extended line between axis 20, the center of rotation of shaft 12 and center 21 of the piston itself. Crest 19 sweeps along the surface 22 of a cylindrical wall 23 in a cylinder casing 24. Wall 23 defines a cylindrical chamber closed at each end by the walls 13 normal thereto. The fit between crest 19 and surface 22 is sufficiently good as to constitute a barrier against significant passage of gas from one part of the chamber defined by wall 23 to another part past crest 19. The ends of piston 17 are circularly recessed and have a sealing ring 25 disposed therein to seal the ends of the piston as such sealing rings 25 slide on the respective walls 13 suitably finished on the inside thereof for that purpose.

Casing 24 is radially recessed at 26 and at 27 to provide guideways for a near radial vane 28 and a far radial vane 29, respectively, based upon a predetermined direction of rotation 30 for shaft 12 and piston 17 in chamber 22. The respective ends of the vanes 28 and 29 extend into close fitting relation to the respective end walls 13. The edges 31 and 32 of the respective vanes are slightly rounded to bear evenly in sealing relation on the periphery of piston 17 for smooth relative motion between such vanes and piston 17 as it rotates.

Casing 24 is provided with an outer wall 33 which with cylindrical wall 23 forms jacket spaces 34a and 34b through which cooling water or other coolant may be circulated by means of pipes 35. Pedestal feet 36 may also be provided on each cylinder 10 for the securing thereof an appropriate foundation, or other equipment. Cylindrical wall 23 is provided with a firing port 37, an exhaust port 38, a combustion air inlet port 39 and a compressed combustion air outlet port 40. As crest 19 rotates from its zero degree position in line with far vane 29, it will radially subdivide the cylindrical chamber within wall 23 depending upon the angular position of crest 19. With that crest in the position shown in full line in FIGURE 1, there is a space 41 on the far side of far vane 29, proceeding in a clockwise direction to crest 19, another space 42 from crest 19 to the near side of near vane 28 and a still further space 43 between the far side of near vane 28 and the near side of far vane 29. As crest 19 sweeps the wall 23 bounding space 41, any negative pressure build-up therein is avoided by providing circumferential grooves 44 extending from the far side of far vane 29 to firing port 37. And, like grooves 45 on the near side of far vane 29 to outlet port 40 prevent any back pressure with that point as crest 19 sweeps past port 40 on its way to its zero degree position.

A pipe 46 is connected to port 38 to exhaust combustion gases from space 42 as piston 17 rotates causing crest 19 to sweep therethrough and push spent gases out through port 38. As crest 19 reaches vane 28, piston 17 will be in the chain line position 47 and the outer edge of vane 28 will be in position 28a, with the exhaust step having been completed. The entry of crest 19 in the space 43 will begin the step of compressing combustion air therein earlier admitted by the opening of a poppet valve 48 having a stem slidably held in guide 49 fastened to casing 24. A very weak spring 50 normally holds valve 48 closed except that when crest 19 sweeps past port 39 it will create a vacuum on the following side thereof between such following side and the far side of vane 28 causing valve 48 to open and combustion air to rush in through a pipe 51 past valve 48 into the space 43 on the following side of the piston. In the meantime, combustion air in the space 43 between the leading portion of the periphery of piston 17 and the near side of vane 29 will be compressed as crest 19 passes port 39 and forced out of space 43 through port 40 and past outlet valve 52 opened by the air pressure in the course of such a compressing step. Valve 52 has a stem which is slidably held in a holder 53 fastened to casing 24. A spring 54 normally holds valve 52 closed except when combustion air is being compressed in space 43 and forced therethrough. It will be noted that irrespective of the pressure created by the rotation of piston 17 and its crest 19 in space 43, valve 48 can only be opened in an inward direction whereas valve 52 can only be opened in an outward direction. The passage for compressed air passing valve 52 extends through a conduit 55 which has one branch leading into pipe 56 and another branch leading into a conduit 57 connected respectively to the guide passages 26 and 27 for the radial vanes to bias such vanes at all times into engagement with the periphery of piston 17. If desired, springs or other biasing members may be used instead of or as a supplement to the bias construction shown in the illustrated embodiment.

A cylindrical valve body 58 has a base 59 which is bolted to casing 24 and has a discharge opening 60 in alignment with firing port 37. Firing port 37 tangentially enters the cylindrical chamber generally in a direction corresponding to the direction of rotation of piston 17 so that combustion gases will exert their expansive force upon the following side of piston 17 when it is in a position such as that shown in full line form in FIGURE 1 to provide a firing stroke or step and thereby the power needed for piston 17 to complete its revolution and enable shaft 12 to do external useful work. A cap 61 is fastened to the top of body 58 and connected by a pipe 62 to conduit 55 through a cooling coil 63, or other heat radiating device. Preferably, a check valve 64 is provided in pipe 62 with a pressure relief valve 65 incorporated therein. The dissipation of heat from the compressed air as it passes through coil 63 may be increased by blowing air, or spraying water, upon the coil.

The upper portion of valve body 58 is provided with a circular valve bore 66 in which the upper large part of a discharge valve 67 reciprocates. The lower portion of valve body 58 forms a combustion chamber 68 into which the lower part 69 of valve 67 extends when it is in the position shown in FIGURE 1. Such part 69 of valve 67 is of smaller cross section that the upper part and the bottom of part 69 closes discharge opening 60 when it is against a seat 70 made up of suitable valve seat material. A plurality of openings 71 extend horizontally between the inside and outside of valve 67 near the bottom of the larger part to enable compressed air entering the interior of valve body 58 and valve 67 to fill combustion chamber 68 around the outside of part 69. A spark plug 72 extends into chamber 68 and is appropriately connected to timer 15. A fuel injector nozzle 73 also extends into combustion chamber 68, said nozzle being supplied with a fuel such as gasoline by a pipe 74, the quantity, periodicity and duration of such fuel injection being regulated by the controller 16.

In operation, the cylinder 10 and portions thereof function as set forth above. When a charge of fuel is injected into the combustion chamber 68, it mixes with the compressed air therein forming a combustible mixture which is ignited by spark plug 72 when crest 19 of piston 17 is in its preselected position, such as that shown in the illustrated full line position. Such ignition of the combustible mixture abruptly forces value 67 to rise where it strikes the inner edge of a gasket 75 which acts also somewhat in the nature of a cushion, the openings 71 thereupon being closed by their entering the lower part of bore 66. The combusting gases from the combustion chamber 68 are free to move only out through the firing port 37 as they expand in the course of the firing step to strike the following side of the piston 17 and drive it through the remainder of the cycle steps which occur in the course of a single revolution; the firing step being repeated when crest 19 next moves again into power stroke position. Upon dissipation of the pressure of the combusting gases as crest 19 moves away from port 37, valve 67 descends closing opening 60 and connecting combustion chamber 68 to the compressed combustion air supply pipe to ready it for the next firing step. The steps per revolution of piston 17 are repetitive and self-sustaining. Lubrication pipes 76 supply lubricant through an annular opening 77 to the walls of bore 66 and the exterior of the upper larger portion of valve 67. In addition, if desired, some lubricant may be injected through nozzle 74 with the fuel to pass, if desired, into the cylindrical chamber to lubricate surface 22.

It is evident that various changes may be made in the illustrated embodiment and other embodiments provided without departure from the spirit of my invention or the scope of the appended claims.

I claim:

1. In a rotary engine, apparatus comprising, in combination, a right circular cylindrical chamber having side and end walls, a straight rotatable shaft in coaxial position in said chamber, a rotatable smooth periphery piston fixed to said shaft having a crest at the greatest distance of any portion thereof from the axis of rotation, the crest and ends of said piston being in close fitting relation to the walls of said chamber, spaced vanes extending from said side wall into engagement with the periphery of said piston, a firing port connected to said chamber to discharge combustion gases generally in the direction of rotation of said shaft and piston, an air inlet port and a compressed air outlet port between two successive such vanes, an exhaust port in one of said walls beyond the space between said two successive such vanes, a fluid pressure operated slidable valve to open and close the inlet end of said firing port free of positive connection to said piston, a combustion chamber adjacent said valve and adjoining said cylindrical chamber and connected to said air outlet port when said valve is in one position and to said firing port when said valve is in another position, and means for periodically discharging fuel under pressure into said combustion chamber for admixture therein with air admitted through said air outlet port and igniting the same when said crest is adjacent said firing port to move said valve to cut off said air outlet port and drive said piston.

2. In a rotary internal combustion engine, apparatus comprising, in combination, a right circular cylindrical chamber, a continuous periphery piston in said chamber rotatable about a center spaced from its dimensional center, said piston having a crest portion to fit closely to the side of said chamber in the course of its rotation and demarcating a leading and a following side of said piston, vanes extending into said chamber to ride on the periphery of said piston, means for forming a combustible mixture in situ adjacent one angular location around said chamber and periodically igniting and discharging said combustible mixture into said chamber at a predetermined location against the following side of said piston, independent air and fuel admission means for said first-named means respectively to form said combustible mixture adjoining said predetermined location, means operative between the leading side of said piston and one of said vanes to sweep products of combustion out of said chamber, means separated by two of said vanes from said two first-named means and operative in one variable space between the following side of said piston and the nearer of said two of said vanes for drawing combustion air into said one variable space, and, operative in another variable space between the leading side of said piston and the farther of said two of said vanes for compressing combustion air drawn in in the previous revolution of said piston, and fluid pressure operated valve means free of positive connection to said piston and alternately connecting the compressed combustion air in said another variable space with said first-named means to supply compressed combustion air for said combustible mixture, said valve means being moved to cut off said air admission means and to connect said first-named means to said chamber when said mixture is ignited.

3. A rotary internal combustion engine as set forth in claim 2, having peripheral relief means in said chamber adjacent said predetermined location to inhibit retarding pressure in said chamber against the leading side of said piston.

4. In a rotary engine, apparatus comprising, in combination, a casing having a cylindrical chamber with a circular wall and end walls normal to the axis of said chamber, a rotatable shaft in coaxial position in said chamber, an eccentric piston fixed to said shaft, said piston having a crest which sweeps in sealing relation over the circular wall of said chamber, the ends of said piston being in sealing relation to said end walls respectively, a pair of radial vanes extending between said circular wall and said piston in angularly spaced relation to each other, means for urging said vanes into engagement with said piston, a firing port tangentially connected to said cylindrical chamber to discharge combustion gases generally in the direction of rotation of said shaft and piston, an outlet port in said circular wall on one side of one of said vanes, an air inlet port in said circular wall adjacent the other side of said last-mentioned vane, a compressed air outlet port adjacent one side of the other vane, a cylindrical valve body having a valve chamber and a discharge opening in communication with said firing port, said valve chamber having an upper and a lower portion, said lower portion forming a combustion chamber, a reciprocable differential cup-shaped valve slidable in said valve chamber, said valve having an upper portion of one diameter slidably engaging said upper portion of said valve chamber and a lower portion of smaller diameter in said lower portion of said valve chamber adapted to close said discharge opening when said valve is in its lower position, said valve further having openings between the interior and exterior thereof which are in communication with said combustion chamber when said valve closes said discharge opening, cushion means to stop upward movement of said valve, said openings through said valve being closed when said valve is in its upper position, means for connecting said compressed air outlet port to the interior of said upper portion of said valve chamber and said valve, means for cooling compressed air passing through said last-named means, and means for periodically discharging and igniting fuel under pressure in said combustion chamber when said crest is in firing position adjacent said firing port.

5. In a rotary engine, apparatus comprising, in combination, a cylindrical chamber having side and end walls, a straight rotatable shaft in coaxial position in said chamber, an eccentric piston fixed to said shaft, said piston having a crest to sweep around said chamber, the crest and ends of said piston being in close fitting relation to the walls of said chamber, generally radial vanes extending from said side wall into engagement with said piston, said vanes being in angularly spaced relation, a firing port connected to said chamber to discharge combustion gases generally in the direction of rotation of said shaft and piston, an outlet port in one of said walls adjacent one side of one of said vanes, an air inlet port extending through one of said walls adjacent the other side of said last-mentioned vane, a compressed air outlet port in one of said walls adjacent one side of another vane, a valve chamber having upper and lower portions and a discharge opening in said lower portion leading to said firing port, the lower portion of said valve chamber forming a combustion chamber, a movable valve in said valve chamber, said valve having an upper portion of one diameter slidably engaged in the upper portion of said valve chamber and a lower portion of smaller diameter in said combustion chamber adapted to close said discharge opening when said valve is in its lower position, said valve further having openings extending between said valve chamber above said valve and said combustion chamber when said valve closes said discharge opening, said openings being closed when said valve is in its upper position, means for connecting said compressed air outlet port to said combustion chamber through the interior of said upper portion of said valve chamber and said valve, and means for periodically discharging fuel under pressure into said combustion chamber and igniting the same when said crest is adjacent said firing port.

References Cited in the file of this patent

UNITED STATES PATENTS

| | | |
|---|---|---|
| 660,129 | Standish | Oct. 23, 1900 |
| 753,086 | Mains | Feb. 23, 1904 |
| 1,427,053 | Bidwell | Aug. 22 1922 |
| 1,799,527 | Plato | Apr. 7, 1931 |
| 1,846,298 | Alcznauer | Feb. 23, 1932 |

FOREIGN PATENTS

| | | |
|---|---|---|
| 324,817 | Germany | Sept. 3, 1920 |